United States Patent

[11] 3,533,346

[72] Inventors Irving Erlichman
Natick;
Richard R. Wareham, Marblehead,
Massachusetts
[21] Appl. No. 740,628
[22] Filed June 27, 1968
[45] Patented Oct. 13, 1970
[73] Assignee Polaroid Corporation
Cambridge, Massachusetts
a corporation of Delaware

[54] EXPOSURE CONTROL APPARATUS
7 Claims, 4 Drawing Figs.
[52] U.S. Cl.............................................. 95/53,
95/60
[51] Int. Cl....................................... G03b 9/66,
G03b 9/08
[50] Field of Search.......................... 95/53, 57,
58, 59, 60, 62, (Consultation)

[56] References Cited
UNITED STATES PATENTS
2,206,811  7/1940  Drotning et al..............  95/60

*Primary Examiner*—Norton Ansher
*Assistant Examiner*—M. L. Gellner
*Attorneys*—Brown and Mikulka; William D. Roberson and James L. Neal

ABSTRACT: An exposure controlled apparatus has a reciprocally driven advancing mechanism which automatically engages and cocks a shutter after exposure preparing it for subsequent operation. The advancing mechanism may be a solenoid or an electric motor driving a rod by means of a cam. The advancing mechanism engages ratchet teeth on the shutter to cock it. Return of the shutter is prevented by means of a pawl engaging the ratchet teeth. The advancing mechanism is mounted on a plate which is pivoted to release the shutter for exposure.

Patented Oct. 13, 1970

INVENTORS
Irving Erlichman
and
Richard R. Wareham

BY

Brown and Mikulka
and
James L. Neal
ATTORNEYS

EXPOSURE CONTROL APPARATUS

SUMMARY OF THE INVENTION

The exposure control apparatus of this invention includes a shutter which is movable from a reset position to a rundown position under the influence of a shutter drive means for producing a photographic exposure and a cocking mechanism for automatically advancing the shutter from its rundown position to its reset position subsequent to each exposure producing operation of the shutter.

The cocking mechanism includes a reciprocally driven advancing mechanism which automatically engages the shutter and incrementally advances it to its reset position while simultaneously storing energy in the shutter drive means.

In a preferred embodiment of the invention, the advancing mechanism is mounted on a movable actuating member. The actuating member is movable to position the advancing means for engagement with the shutter wherein the advancing means is operable to advance the shutter from its rundown position to its reset position and then releasably retain the shutter in the reset position or to position the advancing means for disengagement with the shutter wherein exposure producing operation of the shutter is permitted.

It is an object of this invention to provide an exposure control apparatus for a photographic camera which includes means for automatically resetting a shutter subsequent to exposure producing operation thereof.

It is a further object of this invention to provide an exposure control apparatus which includes means for automatically resetting a shutter subsequent exposure producing operation wherein engagement of the shutter by the resetting means is effective to hold the shutter in the reset position and disengagement of the shutter by the resetting means is effective to release the shutter for exposure producing operation.

DETAILED DESCRIPTION OF THE DRAWINGS

Figure 1:
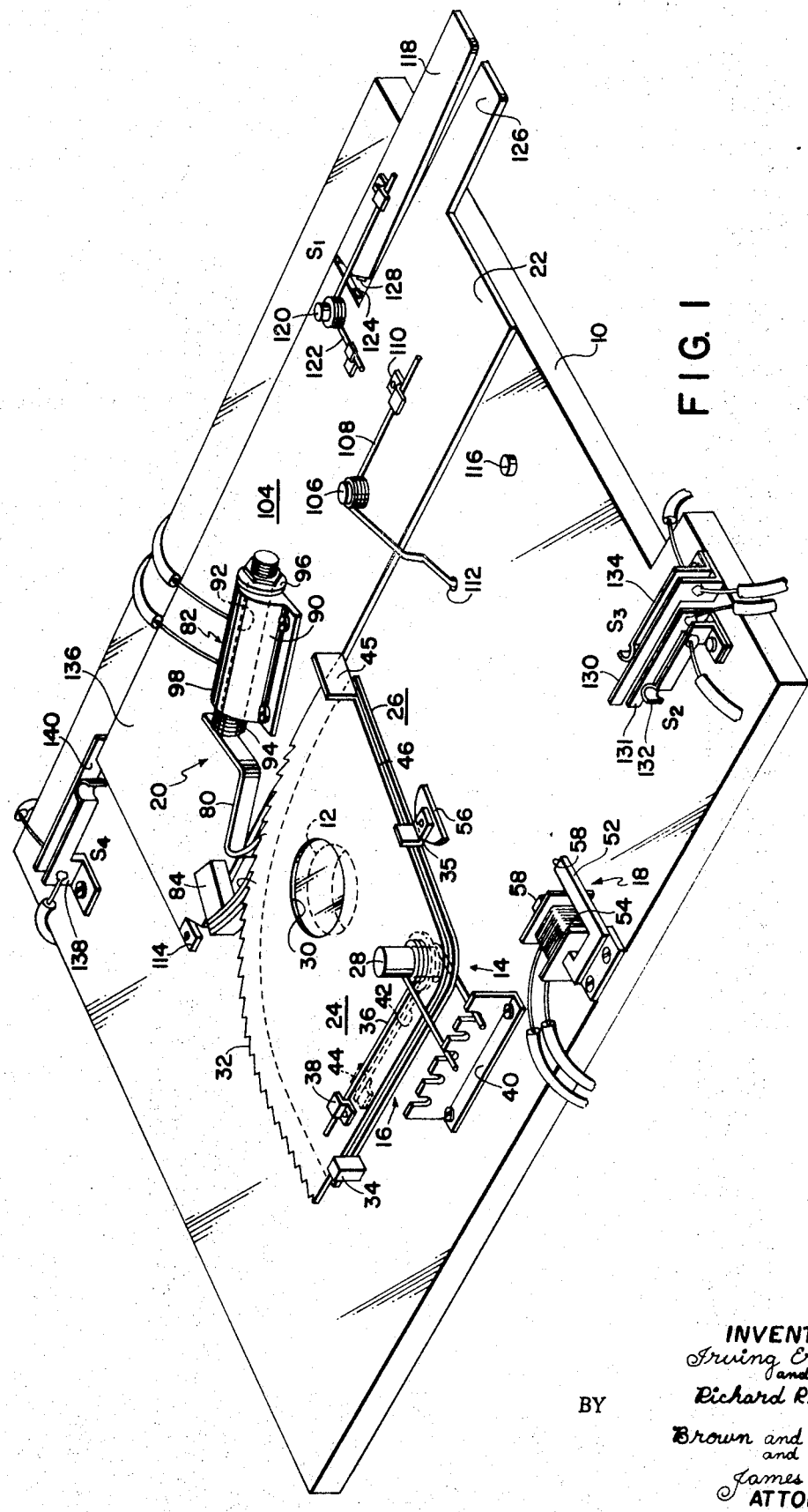
FIG. 1 is a perspective view of a preferred embodiment of the exposure control apparatus of this invention.

The apparatus of FIG. 1 includes base plate 10 forming exposure aperture 12, shutter means 14 for blocking and unblocking movement relative to aperture 12, shutter drive means 16, releasable holding means 18 for influencing shutter operation, reciprocally advancing means 20 and actuating means 22.

Shutter means 14 includes opening blade 24 and closing blade 26. The opening blade is pivotally mounted upon support 28 for movement from a reset position wherein it blocks the exposure aperture to a rundown position wherein it unblocks the exposure aperture to initiate a photographic exposure. The exposure aperture is unblocked by movement of aperture 30 formed by the opening blade into superposition with the exposure aperture. Opening blade 24 also supports an engageable means which, in the illustrated embodiment, comprises a series of teeth forming ratchet 32 along the peripheral edge of opening blade 24 to facilitate operation of the device in a manner hereafter to be described. The ratchet assumes a circular configuration having pivotal support 28 as its center. Stop means 34 is located adjacent the rundown position of opening blade 24 to terminate movement of the blade in its rundown position. Closing blade 26, also pivotally mounted upon support 28, is movable from a reset position wherein it unblocks the exposure aperture to a rundown position wherein it blocks the exposure aperture for terminating exposure. Blade 26 includes projection 35. In FIG. 1, blade 24 unblocks aperture 12 and blade 26 blocks aperture 12.

Shutter drive means 16 comprises two springs. Spring 36 is wound about support 28 and attached to opening blade 24 by anchor 38 and fixedly mounted to base plate 10 by anchor 40 for continuously biasing and driving the opening blade counterclockwise from its reset position to its rundown position. Spring 42 is wound about support 28 and attached to the closing blade by anchor 44 and fixedly mounted to base plate 10 by anchor 40 for continuously biasing and driving the closing blade from its reset position to its rundown position. In the rundown position, closing blade 26 blocks the exposure aperture and projection 35 engages edge 46 of opening blade 24 to halt movement of the closing blade in its rundown position.

Holding means 18 is for releasably retaining the closing blade in its aperture unblocking position after movement of the opening blade to its aperture unblocking position. It involves an electromagnet and electrical control circuit 50. The electromagnet includes U-shaped core 52, electrically energizable coil 54 wound around one leg of the core and magnetizable keeper 56 pivotally attached to projection 35 of closing blade 26. Coil 54 is included in circuit 50 as shown schematically in FIG. 2. The free ends 58 of the core are coplanar and cooperable with magnetizable keeper 56, the core of the electromagnet being positioned adjacent the reset position of the closing blade so that free ends 58 are positioned for contact with the keeper when the closing blade is in the aforesaid reset position. Keeper 56 and core 52 thereby define a complete magnetic circuit. When coil 54 is energized, a sufficient magnetomotive force is applied to the magnetic circuit to hold the keeper against the core, in opposition to the force of spring 42, and thus retain the closing blade in its reset position.

Figure 2:
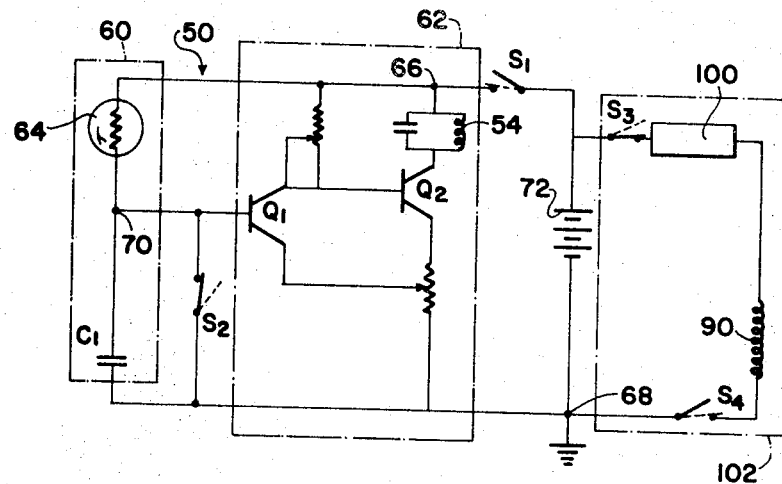
FIG. 2 is a schematic wiring diagram of electrical circuitry usable with the apparatus of FIG. 1.

Control circuit 50, shown in FIG. 2, incorporates timing circuit 60 and trigger circuit 62. Timing circuit 60 includes photoresponsive element 64, such as a cadmium sulfide photocell or the like exposed to light from a scene being photographed and characterized by resistance related to the level of scene brightness and capacitor $C_i$ connected in series between terminals 66 and 68. Circuit 60 constitutes an integrating circuit responsive to the light level of the scene being photographed, the input terminal of which is at 66 and the output terminal of which is at 70. Trigger circuit 62 may be, for example, a transistorized two-stage Schmitt type trigger circuit responsive to the output voltage of timing circuit 60. A circuit of this type is shown and fully described in U.S. Pat. No. 3,241,471 issued to John P. Burgarella on March 22, 1966. Trigger circuit 62 has an input that is a normally not-conducting stage including transistor $Q_1$ and an output that is a normally conducting stage including transistor $Q_1$. While the two stages of the trigger circuit are referred to as "normally not-conducting" and "normally conducting", it should be obvious that this characterization is applicable only when a voltage source is supplied across terminals 66 and 68. Voltage source 72 is shown in the form of a battery of potential $E_o$ connected between terminals 66 and 68 through normally open switch $S_1$. Switch $S_1$ is closed to apply voltage across terminals 66 and 68 during initiation of exposure producing operation of the apparatus, in a manner hereafter to be described. Switch $S_1$ must be mounted for closure prior to release of opening blade 24 for movement from its reset position. Circuit 50 also includes switch $S_2$ which is biased open and adapted to be closed by the presence of opening blade 24 in its reset position.

The shutter mechanism thus includes a first shutter blade movable from a reset position to a rundown position for initiating exposure and a second blade movable from a reset position to a rundown position for terminating exposure. The second blade is releasably retained in its reset position after movement of the first blade from its reset position by the electromagnet. Circuit means 50 operates to cut off the flow of current to the electromagnet to free the second blade for movement to its rundown position a predetermined timed interval after movement of the first blade from its reset position toward its rundown position. Movement of the first blade from its reset position permits switch $S_2$ to open to initiate the timing operation and thereby control the time of release of the second blade.

At the instant switch $S_1$ is closed, and before switch $S_2$ is opened by movement of the first blade from its reset position, a ground potential voltage is applied at terminal 70. When switch $S_2$ is opened, there appears at output terminal 70 a voltage which changes from the initial value, e.g., ground potential, to a predetermined value during a period of time dependent upon the value of capacitor $C_1$ and the resistance of photoresponsive element 64. When the potential at terminal 70 reaches the aforesaid predetermined value, the normally not-conducting transistor $Q_1$ is forward biased and conducts whereupon the normally conducting transistor $Q_2$ is switched to its not-conducting stage. When transistor $Q_2$ is switched to its not-conducting stage, coil 54 of the electromagnet is deenergized to release the second blade for exposure terminating movement.

Reciprocatory advancing means 20 includes reciprocatory pawl 80 driven by electromechanical drive means 82 and a check pawl, 84. Reciprocatory pawl 80 and check pawl 84 are mounted upon actuating means 22 for cooperative engagement with ratchet 32. Reciprocation of pawl 80 incrementally advances the opening and closing blades from their respected rundown positions toward their reset positions against the action of springs 36 and 42.

The number of teeth per inch on ratchet 32 is not critical; however, a pitch resulting in 50 to 64 teeth per inch facilitates smooth operation. In the apparatus of FIG. 1, the stroke of the pawl substantially equals the pitch of the ratchet so that the ratchet teeth are each engaged in succession. The effective stroke of the pawl takes place as the pawl moves from left to right, as viewed in FIG. 1. Check pawl 84 prevents return of the opening and closing shutter blades to their rundown positions under the influence of the aforesaid springs 36 and 42 during movement of the reciprocatory pawl from right to left. Check pawl 84 includes leaf spring-like members 86 which engage the teeth of ratchet 32 to prevent counterclockwise movement of opening blade 24 but which flex to permit the teeth of the ratchet to move past it as the opening blade moves clockwise. Pawl 80 comprises a resilient member having portion 88 for engagement with the teeth of ratchet 32 so that left to right movement of the pawl will effect clockwise advancement of opening blade 24. The resiliency of pawl 80 continuously biases it into engagement with the ratchet teeth and also permits it to flex and ride over the teeth without engaging the teeth as it moves from right to left. Reciprocatory pawl 80 is mounted adjacent ratchet 32 such that its line of reciprocation is substantially tangential to ratchet 32.

The manner in which reciprocatory pawl 80 is driven by electromechanical drive means 82 and the operation of the electromechanical drive means will now be described.

Electromechanical drive means 82 includes solenoid 90 and core 92. Reciprocatory pawl 80 is supported by core 92 adjacent one end. Housing 98 covers the solenoid and fixedly mounts it upon actuating means 22. The core is mounted for reciprocation within the solenoid and biased to the left by means of spring 94 which acts between housing 98 and pawl 80, urging them in opposite directions. Movement of the core to the left is limited by stop 96 which is larger than the core and positioned at the end thereof opposite the pawl so that it will engage housing 98. When the electromechanical drive means is energized, it drives the core to the right, against the force of spring 94 and thus establishes the positive drive stroke of reciprocatory pawl 80. Movement to the right is limited by interaction between a portion of pawl 80 and housing 98. Deenergization of the electromechanical drive means permits it to move to the left under the influence of spring 94 until stop 96 strikes the opposing portion of housing 98. Electromechanical drive means 82 is energizable by square wave generating circuit 100. The level of energization of the solenoid alternates between one sufficient to drive the core against the combined forces of springs 36, 42 and 94 and one insufficient to overcome the force of spring 94. The result of intermittent, alternate energization and substantial deenergization of solenoid 90 is that, upon energization, the core is moved to the right; upon intermittent deenergization, it is permitted to move to the left under the action of spring 94. Circuit 102 for controlling the operation of the electromechanical drive means may include in series, solenoid 90, square wave generating circuit 100, battery 72, switch $S_3$ and switch $S_4$. According to this arrangement, circuit 102 is operative only when both switches $S_3$ and $S_4$ are closed. The location and mode of operation of switches $S_3$ and $S_4$ will later be described.

Actuating means 22 includes lever 104 pivotally mounted relative to base plate 10 by pin 106 and biased counterclockwise by spring 108, one end of which abuts anchor 110 on lever 104 and the other end of which is anchored to base plate 10 by anchor 112. Counterclockwise and clockwise movement of the lever are limited by stops 114 and 116, respectively. Switch operating member 118 is pivotally mounted to lever 104 by pin 120 and biased for counterclockwise movement by spring means 122.

The operative locations of the various switches discussed above will now be described.

One terminal 124 of switch $S_1$ is mounted upon extension 126 of lever 104 and the other terminal 128 is mounted upon member 118 for cooperation with terminal 124.

Switches $S_2$ and $S_3$ are mounted adjacent the reset positions of the shutter blades and include terminals 131 and 132 and terminals 130 and 134, respectively. Terminal 131 of switch $S_2$ is resiliently biased out of contact with terminal 132; terminal 130 of switch $S_3$ is resiliently biased into contact with terminal 134. Terminals 130 and 131 extend into the path of opening blade 24 such that, when the opening blade is in its reset position, nonconductive projection 45 thereon is engageable with both terminals 130 and 131 for moving them against their bias, terminal 131 being first moved into contact with terminal 132 to close switch $S_2$ and immediately thereafter terminal 130 being moved from contact with terminal 134 to open switch $S_3$.

Switch $S_4$ is mounted adjacent corner 136 of lever 104 and includes relatively rigid terminal 138 and resilient terminal 140. The resilient terminal is biased into contact with rigid terminal 138 so that switch $S_4$ is biased closed. Resilient terminal 140 is positioned for engagement by corner 136 as lever 104 is pivoted clockwise so that clockwise movement of lever 104 opens switch $S_4$. Engagement between corner 136 and resilient terminal 140 continues and is effected to hold switch $S_4$ in the open condition until counterclockwise movement of lever 104 permits resilient terminal 140 to move into contact with terminal 138.

Operation of the apparatus of FIG. 1 will now be described. FIG. 1 is an illustration of the apparatus in the aperture unblocking condition. Prior to exposure, the apparatus is in the reset condition, which is illustrated in broken lines in FIG. 1. To initiate exposure producing operation of the apparatus, actuating means 22 is operated by manually applying pressure to member 118. This causes member 118 to pivot about pin 120, against the bias of spring 22 until terminal 128 contacts terminal 124 to close switch $S_1$ and to thus energize control circuit 50. Energization of circuit 50, in turn energizes coil 54 of the electromagnet for retaining closing blade 26 in its reset position. Continued operation of actuating means 22 causes lever 104 to rotate clockwise about pin 106 against the bias of spring 108. This lifts reciprocatory advancing means from engagement with ratchet 32 to release the opening blade for counterclockwise movement from its reset position toward its rundown position according to the bias of drive spring 36 and simultaneously moves resilient terminal 140 out of contact with terminal 138 to open switch $S_4$. Closing blade 26 is retained in its reset position by magnetic engagement between U-shaped core 52 and magnetizable keeper 56 of the electromagnet. Clockwise movement of the opening blade continues until a portion thereof abuts stop 34, at which position aperture 30 in the opening blade is superimposed over exposure aperture 12 to permit light to pass therethrough and thereby initiate an exposure interval.

Initial aperture unblocking movement of opening blade 24 causes the opening blade to move out of engagement with resilient terminals 130 and 131 to permit $S_2$ to open and $S_3$ to close.

The opening of switch $S_2$ initiates the timing operation discussed above. At the end of the timed interval, the duration of which is controlled by circuit means 60 in accordance with the light level of the scene being photographed in the manner aforesaid, coil 54 of the electromagnet is deenergized, thus ending the magnetic attraction between core 52 and keeper 56; the closing blade 26 is thus released for counterclockwise movement from its reset position toward its rundown position in accordance with the bias of spring 42. Clockwise movement of blade 26 continues until projection 35 thereon engages edge portion of opening blade 24 to terminate movement of the closing blade. In this position, closing blade 26 blocks the exposure aperture to thereby terminate the exposure interval.

Closure of switch $S_3$ occurs substantially simultaneously with the opening of switch $S_2$. However, closure of switch $S_3$ does not complete circuit 102 since switch $S_4$ is being held in an open position by actuating means 22.

The manual pressure imparted to actuating means 22 is released subsequent to exposure. Simultaneously, spring means 122 moves member 118 counterclockwise relative to lever 104 to open switch $S_1$ and spring 108 imparts counterclockwise movement to lever 104. The opening of switch $S_1$ inactivates control circuit 50. Counterclockwise movement of lever 104 brings reciprocatory advancing means 20 into engagement with ratchet 32 and permits resilient terminal 140 to contact fixed terminal 138 to close switch $S_4$. Closure of switch $S_4$ completes circuit 102, switch $S_3$ having already been closed as described above. Closure of circuit 102 energizes square wave generating circuit 100 which operates solenoid 90 of the electromagnet. The solenoid alternately pulls core 92 to the right against the action of spring 94 and releases it for movement to the left under the influence of spring 94. Movement of the core to the right causes portion 88 of reciprocatory pawl 80 to engage a tooth of ratchet 32 for imparting clockwise movement to opening blade 24. Since projection 35 of closing blade 26 abuts edge 46 of the opening blade, clockwise movement of the opening blade is imparted to the closing blade. Core 92 is permitted to move to the left under the influence of spring 94 by a distance sufficient to allow portion 88 of resilient spring 90 to engage the next successive tooth of ratchet 32 during its next movement to the right. Check pawl 84, as aforesaid, cooperates with ratchet 32 to prevent counterclockwise movement of the shutter blades during the intervals when reciprocatory pawl 80 is moving to the left. In the embodiment of FIG. 1, the stroke of reciprocatory pawl 80 is equal to or slightly greater than the pitch of the teeth of ratchet 32 so that each stroke of the reciprocatory pawl advances the ratchet by a distance substantially to the pitch of one ratchet tooth. It should be understood, however, that the stroke of the pawl may be adjusted by varying the position of stop 96 along the axis of reciprocation of core 92. Operation of the reciprocatory advancing means 20 continues in this manner until the shutter blades have been returned to their reset positions. When the blades move into their reset positions, portion 45 of opening blade 24 engages terminals 130 and 131 to move them against their bias. Terminal 131 is moved into contact with terminal 132 to close switch $S_2$ and then terminal 130 is moved out of contact with terminal 134 to open switch $S_3$. When closing blade 26 is moved to its reset position, keeper 56 mounted upon projection 35 thereof is pressed into firm contact with U-shaped core 52 of the electromagnet.

The opening of switch $S_3$ deenergizes reciprocatory advancing means 20 and engagement between the reciprocatory advancing means and ratchet 32 retains the opening and closing blades in their respective positions and retains keeper 56 in the aforesaid firm contact with core 52. After the closing of switch $S_2$ and the opening of switch $S_3$, the apparatus is ready for another exposure producing operation.

It can now be appreciated that the above described apparatus is operated simply by one manual operation of actuating means 22 wherein movement of the actuating means permits exposure producing operation of a shutter and release of the actuating means is effective to operate shutter resetting means which returns the shutter blades to their respective positions and then cuts itself off.

Figure 3:
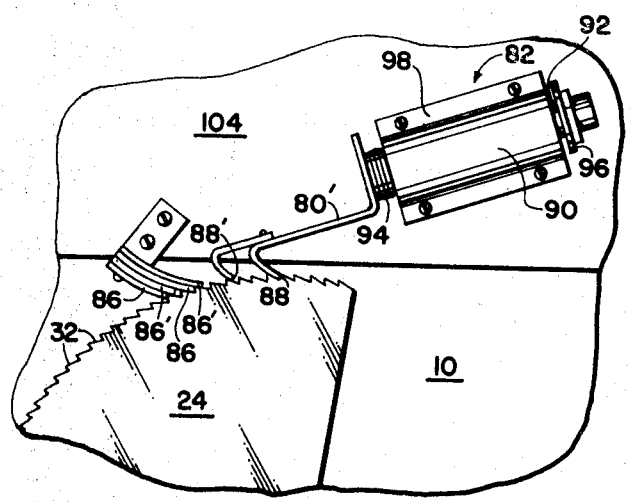
FIG. 3 is a fragmentary view of another embodiment of the invention.

In the above described apparatus, the stroke of the reciprocatory pawl is substantially equal to the pitch of the ratchet. The stroke may be reduced to a length which is less than the pitch of the ratchet by utilizing reciprocatory advancing means of the type shown in FIG. 3 wherein like numbers are used to designate like parts. This apparatus includes double pawl 80' having ratchet engaging portions 88 and 88' and check pawl including leaf spring members 86 and 86'. In operation, a first stroke to the right causes portion 88 to engage a tooth of the pawl and to advance the ratchet a distance equal to one half the pitch. Members 86 of the check pawl engage the ratchet to prevent return thereof as the reciprocatory pawl 80' moves to the left. Upon the next successive movement to the right, portion 88' engages another tooth of the ratchet to again advance the ratchet by a distance equal to one half its pitch. Members 86' then prevent return of the ratchet during movement of pawl 80 to the left. During continuous operation of the reciprocatory advancing means, portions 88 and 88' of pawl 80' continue to alternately engage and advance the ratchet.

Figure 4:
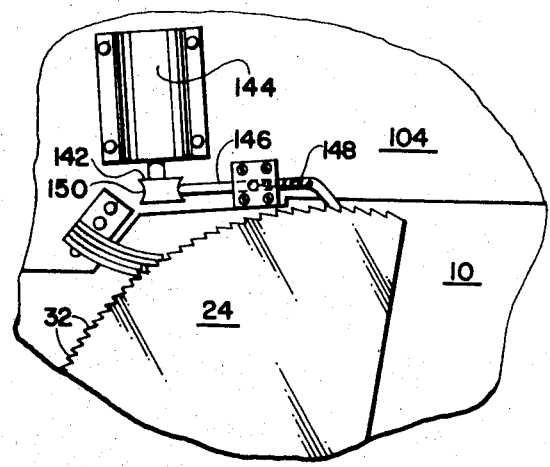
FIG. 4 is a fragmentary view illustrating still another embodiment of the invention.

FIG. 4 illustrates an alternate drive mechanism for reciprocatory advancing means 20. This may comprise rotary cam 142 driven by motor 144 for imparting reciprocatory motion to pawl 146. Spring means 148 bias the pawl for movement to the left and the shape of cam face 150 is such that as the cam rotates, it intermittently advances pawl 146 to the right against the action of spring means 148.

Since certain changes may be made in the above apparatus without departing from the scope of the invention herein involved, it is intended that all matter contained in the above description or shown in the accompanying drawings shall be interpreted as illustrative and not in a limiting sense.

We claim:
1. Photographic exposure control apparatus comprising:
    a. shutter blade means movable from a reset position to a rundown position for influencing a photographic exposure;
    b. means for driving said shutter blade means from said reset position to said rundown position;
    c. engageable means associated with said shutter blade means; and
    d. reciprocatory advancing means cooperatively engaging said engageable means subsequent to exposure influencing movement of said shutter blade means for incrementally advancing said shutter blade means from said rundown position to said reset position and storing energy in said driving means.
2. Photographic exposure control apparatus according to claim 1 wherein said driving means continuously biases said shutter blade means for movement from said reset position and engagement of said engageable means by said reciprocatory advancing means is effective to releasably retain said shutter blade means in said reset position against the bias, further comprising means mounting said reciprocatory advancing means for selective disengagement with said engageable means to permit exposure influencing movement of said shutter blade means under the influence of said driving means.
3. Exposure control apparatus according to claim 2 wherein said mounting means comprises a pivotally mounted lever bearing said reciprocatory advancing means adjacent one end and forming an input adjacent the opposite end, said input being operable to pivot said lever and move said advancing means from engagement with said engageable means.

4. Exposure control apparatus according to claim 1 wherein said engageable means comprises ratchet means affixed to said shutter blade means and said reciprocatory advancing means comprises:
   a. reciprocating pawl means cooperatively engageable with said ratchet means for incrementally advancing said ratchet means to effect the incremental advancement of said shutter blade means toward said reset position and the storage of energy in said driving means; and
   b. check pawl means engageable with said ratchet means for preventing premature movement of said shutter blade means toward said rundown position under the influence of said driving means.

5. Exposure control apparatus according to claim 4 wherein:
   a. said driving means continuously biases said shutter blade means for movement toward said rundown position when said shutter blade means is in said reset position;
   b. engagement of said engageable means by said reciprocatory advancing means is effective to releasably retain said shutter blade means in said reset position against said bias; and
   c. said reciprocatory advancing means is mounted for selective disengagement with said engageable means to effect release of said shutter blade means by said reciprocatory advancing means and thereby permit exposure influencing movement of said shutter blade means under the influence of said driving means.

6. Exposure control apparatus comprising:
   a. shutter blade mean means movable from a reset position to a rundown position for influencing a photographic exposure;
   b. means for biasing said shutter blade means for movement to said rundown position;
   c. movable means mounted adjacent said shutter blade means; and
   d. advancing means supported by said movable means for engaging said shutter blade means subsequent to each exposure and advancing said shutter blade means from said rundown position to said reset position, said advancing means continuing to engage said shutter blade means after advancement thereof to said reset position for retaining said shutter blade means in said reset position, said movable means being movable for disengaging said advancing means from said shutter blade means to permit movement of said shutter blade means from said reset position to said rundown position under the influence of said biasing means.

7. Photographic exposure control apparatus comprising:
   a. shutter blade means movable from a reset position to a rundown position for influencing photographic exposure;
   b. drive means resisting movement of said shutter blade means from said rundown position toward and to said reset position and continuously biasing said shutter blade means for movement toward said rundown position when said shutter blade means is in said reset position;
   c. ratchet means associated with said shutter blade means for advancing said shutter blade means toward and to said reset position when said ratchet means is advanced;
   d. a movable member;
   e. reciprocatory pawl means mounted on said movable member and selectively engageable with said ratchet means subsequent to each exposure influencing operation of said shutter blade means for incrementally advancing said ratchet means to thereby incrementally advance said shutter blade means toward and to said reset position, the advancement of said shutter blade means being in opposition to the resistance of said drive means and being effective to store energy in said drive means, wherein said reciprocatory pawl means continuously engages said ratchet means after return of said shutter blade means to said reset position for retaining said shutter blade means in said reset position; and
   f. means for effecting movement of said movable member for selectively disengaging said reciprocatory pawl means from said ratchet means to permit exposure influencing movement of said shutter blade means under the influence of said drive means.